US010732426B2

(12) United States Patent
Kim

(10) Patent No.: US 10,732,426 B2
(45) Date of Patent: Aug. 4, 2020

(54) TWO-DIMENSIONAL COHERENT BEAM COMBINATION USING CIRCULAR OR SPIRAL DIFFRACTION GRATING

(71) Applicant: Gerald Ho Kim, Fallbrook, CA (US)

(72) Inventor: Gerald Ho Kim, Fallbrook, CA (US)

( * ) Notice: Subject to any disclaimer, the term of this patent is extended or adjusted under 35 U.S.C. 154(b) by 240 days.

(21) Appl. No.: 15/976,727

(22) Filed: May 10, 2018

(65) Prior Publication Data

US 2018/0267325 A1 Sep. 20, 2018

Related U.S. Application Data

(63) Continuation of application No. 15/432,442, filed on Feb. 14, 2017, now Pat. No. 10,025,107.

(60) Provisional application No. 62/295,992, filed on Feb. 16, 2016.

(51) Int. Cl.
*G02B 27/10* (2006.01)
*G02B 5/18* (2006.01)

(52) U.S. Cl.
CPC ....... *G02B 27/1086* (2013.01); *G02B 5/1866* (2013.01); *G02B 27/10* (2013.01); *G02B 27/106* (2013.01)

(58) Field of Classification Search
CPC .......................... G02B 27/1086; G02B 27/10; G02B 27/1866; G02B 5/1866
USPC ........................................................ 359/572
See application file for complete search history.

(56) References Cited

U.S. PATENT DOCUMENTS 4,813,762 A * 3/1989 Leger .................... H01S 5/4062 359/565
4,901,330 A * 2/1990 Wolfram ................ H01S 5/405 372/75
5,210,768 A * 5/1993 Seguin .................... H01S 3/042 372/18
6,456,756 B1 * 9/2002 Mead ..................... G02B 6/425 359/334
7,339,727 B1 * 3/2008 Rothenberg ........ H01S 3/06791 359/349
8,526,110 B1 * 9/2013 Honea ................. H01S 3/06791 359/556
2005/0157762 A1 * 7/2005 DeMaria ............ B23K 26/0604 372/9
2009/0080321 A1 * 3/2009 Kimura ............... G11B 7/1275 369/112.23
2014/0268314 A1 * 9/2014 Dueck ................ G02B 27/1093 359/349
2016/0344162 A1 * 11/2016 Konno .............. B23K 26/0613
2020/0166763 A1 * 5/2020 Nagai .................. G02B 27/145

* cited by examiner

*Primary Examiner* — William R Alexander

(74) *Attorney, Agent, or Firm* — Han IP PLLC; Andy M. Han

(57) ABSTRACT

Examples of combining multiple laser beams into a single laser beam by using a circular or spiral diffraction grating are described. The multiple laser beams can be combined coherently or incoherently depending on the geometrical layout of the laser beams.

9 Claims, 12 Drawing Sheets

TWO-DIMENSIONAL COHERENT BEAM COMBINATION USING CIRCULAR OR SPIRAL DIFFRACTION GRATING

CROSS REFERENCE TO RELATED PATENT APPLICATION(S)

The present disclosure is a part of a Continuation application claiming the priority benefit of U.S. Non-Provisional patent application Ser. No. 15/432,442, filed on Feb. 14, 2017, which claims the priority benefit of U.S. Provisional Patent Application No. 62/295,992, filed on Feb. 16, 2016, the contents of which are incorporated by reference in their entirety.

TECHNICAL FIELD

The present disclosure generally relates to the field of laser and, more particularly, to two-dimensional coherent combining of laser beams.

BACKGROUND

Unless otherwise indicated herein, the approaches described in this section are not prior art to the claims in this application and are not admitted as prior art by inclusion in this section.

The current demand for high power laser systems is growing in the market place and many techniques and methods of increasing laser power have been designed and developed for government and industrial applications. Increasing the brightness of a laser beam allows scaling laser power to a few hundred kilo-watts. There are two distinctive methods of scaling a laser beam such as coherent beam combining (CBC) and incoherent beam combining (IBC). CBC is relatively difficult compared to the IBC beam combining technique due to the phase lock requirements in the CBC technique.

Some of the advantages of the CBC technique include better beam quality, a narrow spectral bandwidth and high brightness compared to the IBC scheme. One of the major IBC methods is increasing brightness of the laser beam by combining multiple beams of different wavelengths, called wavelength beam combination (WBC), in a one-dimensional (1D) or two-dimensional (2D) configuration. There exist approaches that demonstrate a WBC beam combining technique in a 2D configuration using laser sources combined with a first-order grating stack. This WBC concept trades high spatial brightness for relatively large spectral bandwidth by combing multiple bandwidths of the laser sources. In order to improve the brightness in both dimensions a first-order grating stack is used to overlap horizontal and vertical dimensions of the optical beam to improve the brightness in both dimensions. During the WBC technique, a first and second grating are used to combine and improve horizontal and vertical brightness of the laser sources respectively. The combined and improved laser output beam is an incoherent laser beam with a relatively broad spectral bandwidth compared to each laser source.

Also, a similar WBC approach is used exclusively in a fiber amplifier with passive phase control. In order to achieve a single coherent beam combining with a diffractive grating, it requires a feed-back system to passively lock the phase of each fiber amplifier. Still, using this method, this approach broadens the spectral bandwidth of the combined beam. As the number of combined laser sources increases the spectral bandwidth will grow too, making it more difficult to phase-lock all laser sources.

The difficulty in designing a passive coherent beam combining technique lays with the need to lock all phase and spectral overlap of laser sources that are being combined. Most all CBC techniques require a feedback system to passively or actively lock all phase of the laser sources. This would require a very complicated optical or electrical feedback system.

Another difficulty in building a 2D coherent beam combining system is bundling together all laser sources in scaling up to a very high-power laser system. Typically, it is a geometrical constraint to mount all laser sources in a compact form to coherently combine all laser sources. Currently there exists a 2D wavelength beam combining scheme using a grating stack that has two diffractive gratings combining a horizontal and vertical direction separately.

FIG. 9 is a perspective view of a prior art single-wavelength laser beam impinging on a diffraction grating. Referring to FIG. 9, a single-wavelength (monochrome) laser beam 1 impinges on a diffraction grating 5 and creates a diffraction pattern of 0th order 4, 1st order 7 and 2nd order 8. Diffraction grating 5 has a grating pattern of multiple a circular-shaped pattern (e.g., with multiple concentric rings) or a spiral-shape or pattern. Diffraction grating 5 projects perfect rings of diffractive patterns 4, 7 and 8 by the circular or spiral pattern of the grating. The rings of the circular patterned grating or the spiral of the spiral patterned grating are an intrinsic property of diffraction grating 5. In order to create a perfect ring of the diffracted pattern the laser beam 1 needs to impinge on the center of the circular or spiral pattern of the diffraction grating 5. The multiple rings caused by diffractive grating 5 are coherent light diffracted from the laser beam 1. This means that the light beam 2 impinging on the center of diffractive grating 5 splits into three diffractive orders of the laser beam 1 where these resultant beams 6 are in the same frequency and constant phase with respect to each other. The coherent beam characteristic of the diffracted beam caused by the circular or spiral pattern of diffraction grating 5 only works with a laser beam 1 of a single wavelength.

FIG. 10 is a projected side view of FIG. 9. FIG. 10 shows multiple diffracted orders of diffraction grating 5. The side view shows multiple cone-shaped rings are formed. This illustration shows that a single-wavelength (monochrome) laser beam 1 can be diffracted to create three different orders of diffraction patterns as an example. The circular patterned diffraction grating 5 generates diffracted rings of a single-wavelength laser beam 1 as shown in FIG. 10 where it has a bright spot at the center of the patterned rings. However, the spiral patterned diffraction grating 5 generates a dark spot at the center of rings similar to a 'donut' hole shape. The ring patterns 4, 7 and 8 of the diffracted laser beams 6 can be designed or changed by using different patterns in the diffraction grating 5 or changing the grating parameters.

FIG. 11 is a perspective view of a prior art multiple-wavelength laser beam impinging on a diffraction grating. Referring to FIG. 11, a multiple-wavelength laser beam 11 impinges on the diffraction grating 5 where each wavelength of laser beam 11 will generate multiple rings of diffraction orders. For example, if the multiple-wavelength laser beam 11 contains two distinctive wavelengths of λ1 and λ2 of laser beam 12 is impinging on the diffraction grating 5 and each wavelength of λ1 and λ2 will generate multiple rings of diffraction orders of 0th, 1st and $2^{nd}$ orders. The λ1 wavelength of the laser beam 11 will create the 0th order of spot 20, the 1st order of ring 19 and the 2nd order of ring 17.

The λ2 wavelength of the laser beam 11 will create the 0th order of spot 20, the 1st order of ring 14 and the 2nd order of ring 18 where the wavelength of λ1 is shorter than λ2. In this case the diffractive rings of the wavelength λ1 is coherent to each other and it is incoherent to the other wavelength λ2. The multiple-wavelength laser beam 11 can create multiple orders of rings that are coherent to the same wavelength and incoherent to different wavelengths. The wavelength separation technique of using circular or spiral patterned diffraction gratings can be applied to optical signal transmission such as a wavelength-division-multiplex (WDM). Alternatively, it can be used to combine multiple wavelengths into a single optical beam using the reverse process.

FIG. 12 is a projected side view of FIG. 11. FIG. 12 shows multiple diffracted orders of the multiple-wavelength laser beam 11 diffracted by the circular or spiral pattern of the diffraction grating 5. The side view shows that multiple cone-shaped rings are formed by multiple-wavelength laser beam 11. This illustration shows that a multiple-wavelength laser beam 11 can be diffracted to create three different orders of diffraction patterns for each wavelength of two, namely λ1 and λ2. The circular patterned diffraction grating 5 generates diffracted rings of multiple-wavelength laser beam 11 as shown in FIG. 11 where it has a bright spot of the mixed laser beam 11 of wavelength of λ1 and λ2 at the center, and the multiple orders of patterned rings have a distinctive wavelength of λ1 or λ2. However, the spiral patterned diffraction grating generates a dark spot at the center of the diffracted rings like a 'donut' hole shape. The ring patterns of the diffracted laser beams 14, 17, 18, 19 and 20 can be designed or changed by different patterns of the diffraction grating 11 or its grating parameters.

SUMMARY

The following summary is illustrative only and is not intended to be limiting in any way. That is, the following summary is provided to introduce concepts relating to a heat sink for thermal management in an electronic apparatus. Select embodiments of the novel and non-obvious technique are further described below in the detailed description. Thus, the following summary is not intended to identify essential features of the claimed subject matter, nor is it intended for use in determining the scope of the claimed subject matter.

In one aspect, a method of coherently combining a plurality of optical beams may involve arranging a plurality of single-wavelength lasers in a ring-shaped pattern. The method may also involve energizing the plurality of single-wavelength lasers to emit the plurality of optical beams such that the plurality of optical beams impinge on a central region of a diffractive element to combine the optical beams to form a single laser beam. The single laser beam may resonate through a laser cavity formed by a partial reflector and the plurality of single-wavelength lasers.

In another aspect, a method of incoherently combining a plurality of optical beams may involve arranging a plurality of multiple-wavelength lasers in a plurality of ring-shaped patterns. The method may also involve energizing the plurality of multiple-wavelength lasers to emit the plurality of optical beams such that the plurality of optical beams impinge on a central region of a diffractive element to combine the optical beams to form a single laser beam. The single laser beam may resonate through a laser cavity formed by a partial reflector and the plurality of multiple-wavelength lasers.

In one aspect, a system for coherently combining a plurality of optical beams may include a plurality of single-wavelength lasers arranged in a ring-shaped pattern and a diffractive element. When energized, the plurality of single-wavelength lasers may emit the plurality of optical beams such that the plurality of optical beams impinge on a central region of the diffractive element to combine the optical beams to form a single laser beam. The single laser beam may resonate through a laser cavity formed by a partial reflector and the plurality of single-wavelength lasers.

In another aspect, a system for incoherently combining a plurality of optical beams may include a plurality of multiple-wavelength lasers arranged in a plurality of ring-shaped patterns and a diffractive element. When energized, the plurality of multiple-wavelength lasers may emit the plurality of optical beams such that the plurality of optical beams impinge on a central region of the diffractive element to combine the optical beams to form a single laser beam. The single laser beam may resonate through a laser cavity formed by a partial reflector and the plurality of multiple-wavelength lasers.

BRIEF DESCRIPTION OF THE DRAWINGS

The accompanying drawings are included to provide a further understanding of the disclosure and are incorporated in and constitute a part of the present disclosure. The drawings illustrate embodiments of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

A new approach for 2D coherent beam combining scheme is needed to simplify the geometrical design and self-feedback mechanism in order to build a compact and large scalable high-power laser system. To design a scalable 2D coherent beam combining scheme a circular or spiral diffraction grating is used to combine all laser sources in an intra-cavity laser design. In this case a circularly positioned laser sources project their beams on to the center of the circular or spiral diffraction grating to form a single output laser beam. This approach eliminates the double diffraction grating scheme used in the existing approach and the circular or spiral grating provides a 2D coherent beam combine function. Unlike other diffractive grating beam combining methods, the circular or spiral grating provides passive phase locking of all laser sources in single piece operation. Otherwise, the vertical and horizontal axis of the laser beam has to be combined by two separate gratings.

The circular or spiral diffraction grating allows combining all laser sources into a single coherent beam and passive phase locking is also possible. The combined laser beam has a similar or better spectral bandwidth than the laser source. Unlike the WBC process, which increases the spectra bandwidth proportion to the number of the laser sources that are combined. The coherent beam of the circular or spiral diffraction grating provides much better brightness and beam quality than the WBC process.

Illustrative Implementations

Figure 1:
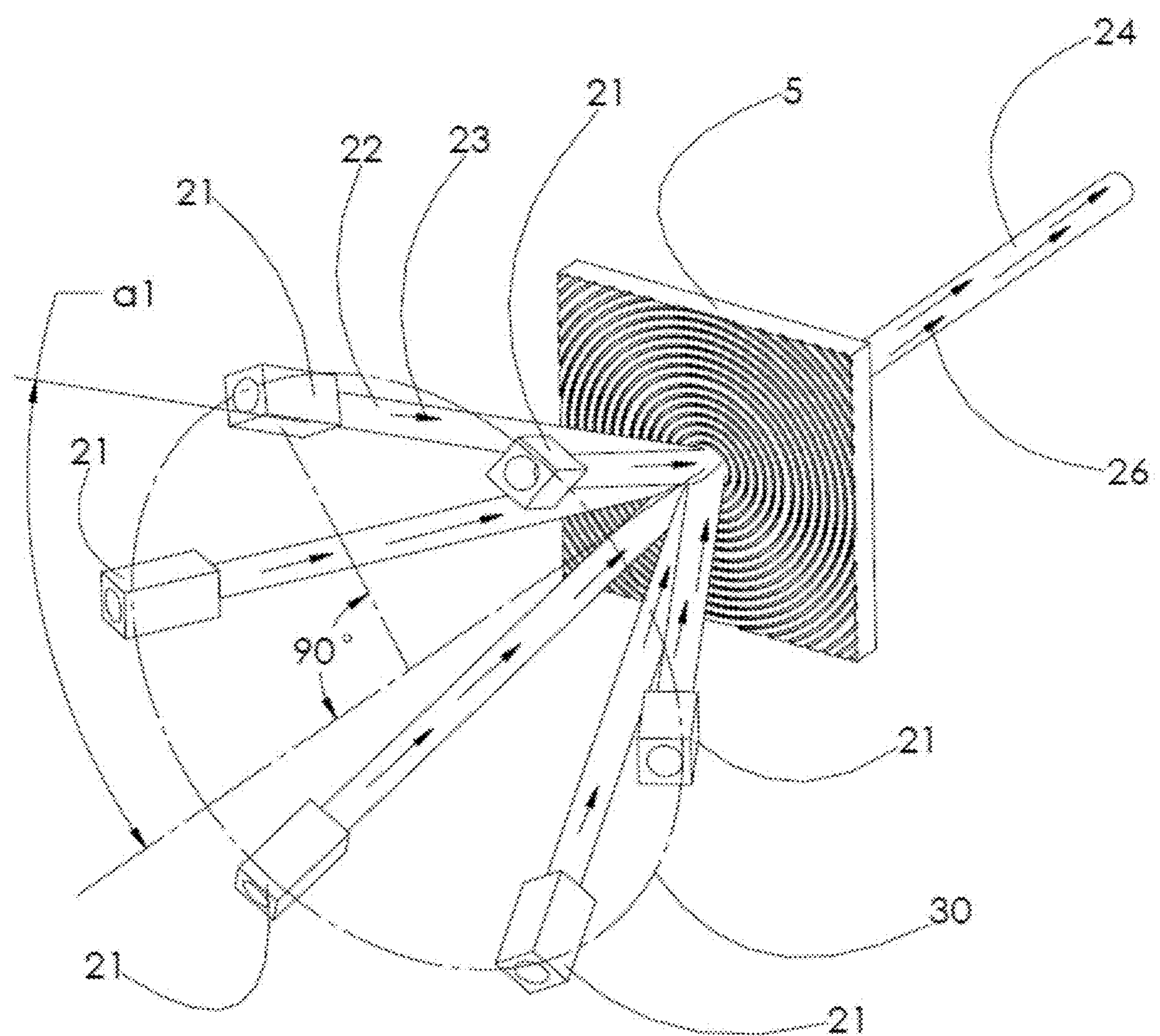
FIG. 1 is a perspective view of combining plural laser beams into a single laser beam using a diffraction grating in a transmissive mode in accordance with an embodiment of the present disclosure.
Figure 9:
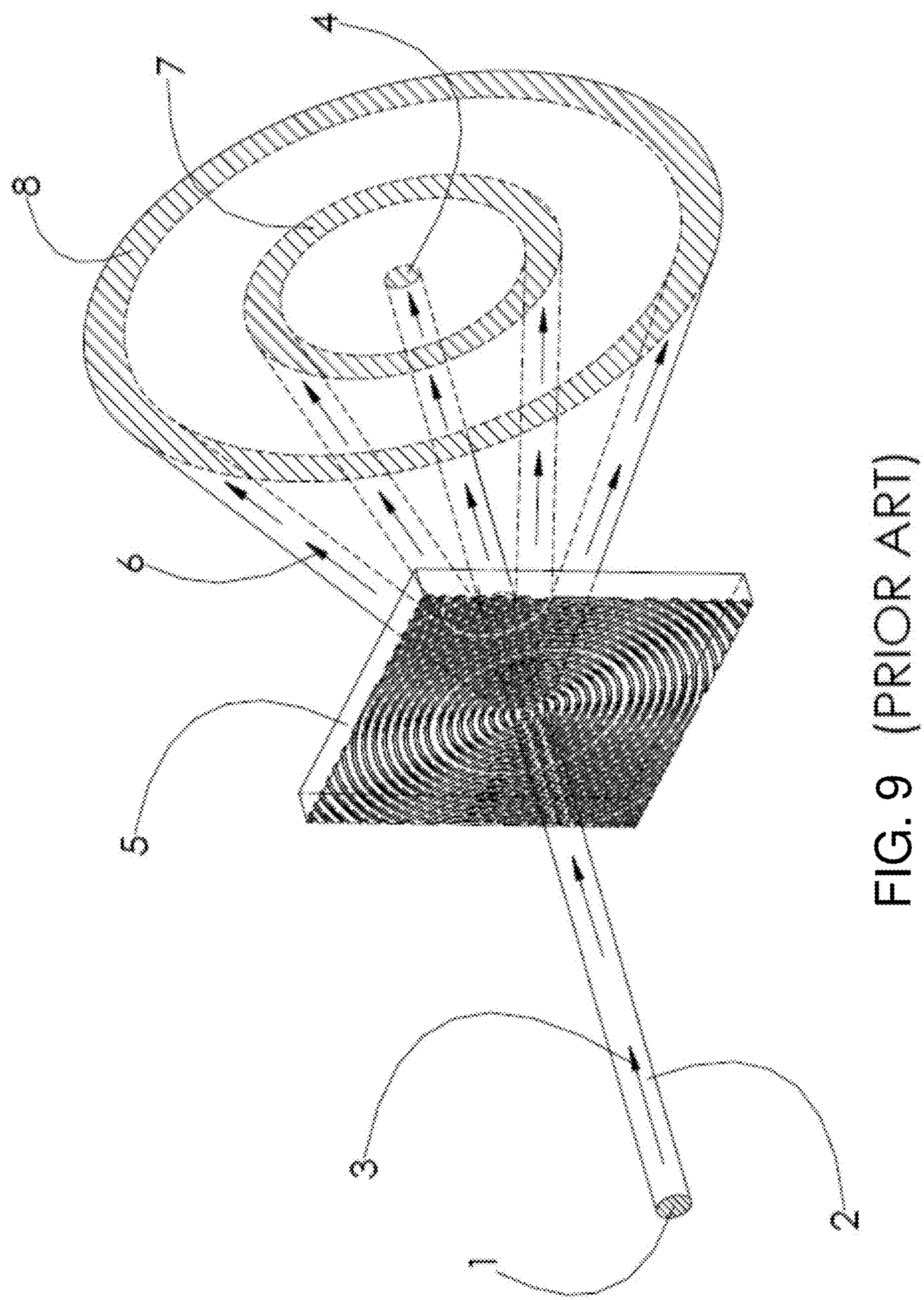
FIG. 9 is a perspective view of a prior art single-wavelength laser beam impinging on a diffraction grating.
Figure 10:
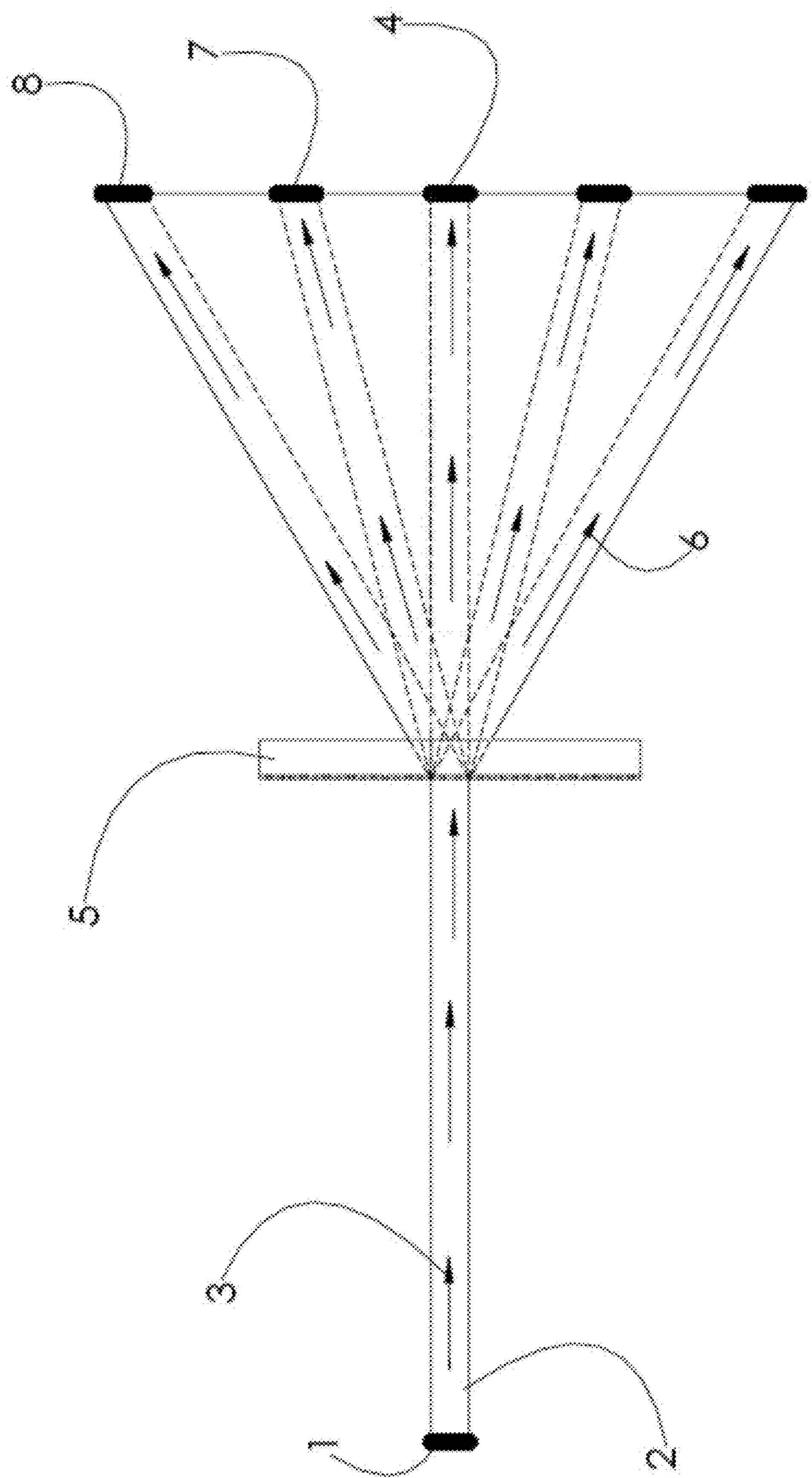
FIG. 10 is a projected side view of FIG. 9.

FIG. 1 is a perspective view of combining plural laser beams into a single laser beam using a diffraction grating in a transmissive mode in accordance with an embodiment of the present disclosure. The example illustrated in FIG. 1 shows combining six lasers 21 into one laser beam 24 using the diffraction grating 5 working in a transmissive (or transparent) mode. The lasers 21 are placed or otherwise arranged in a ring pattern 30 of the diffraction order illustrated in FIG. 9. This beam combining concept is the reverse of the process of that demonstrated in FIG. 9. The lasers 21 are placed in one of the diffraction rings in FIG. 9 and the laser beam 22 emitted by each laser 21 is projected in a direction 23 to a central region of the diffraction grating 5. Due to the diffractive angle a1 of the diffraction grating 5, all laser beams 22 will overlap into a single laser beam 24. In this case the wavelength of all lasers 21 matches with each other and a distance from the diffraction grating 5 to each of the lasers 21 is substantially equaled to each other in order to maintain coherent beam characteristics. That is, the multiple lasers 21 can be seen as being placed on a horizontal plane so as to be equal-distant from the center of diffraction grating 5. The single laser beam 24 has coherent characteristics of beam propagation due to same frequency and constant phase difference. In order to obtain a zero-phase difference in all lasers 21, each phase factor of the lasers 21 can be adjusted to match 'in-phase' status for maximum brightness. The cone angle, a1, is matched with the diffractive angles of the diffraction grating 5 with the monochrome wavelength of the lasers 21. The lasers 21 can be any laser source that can produce a sufficiently narrow spectrum of a single wavelength. For instance, lasers 21 may include semiconductor lasers, fiber lasers, DPSS (diode pumped solid state) lasers, gas lasers, liquid lasers, or any combination thereof.

Figure 2:
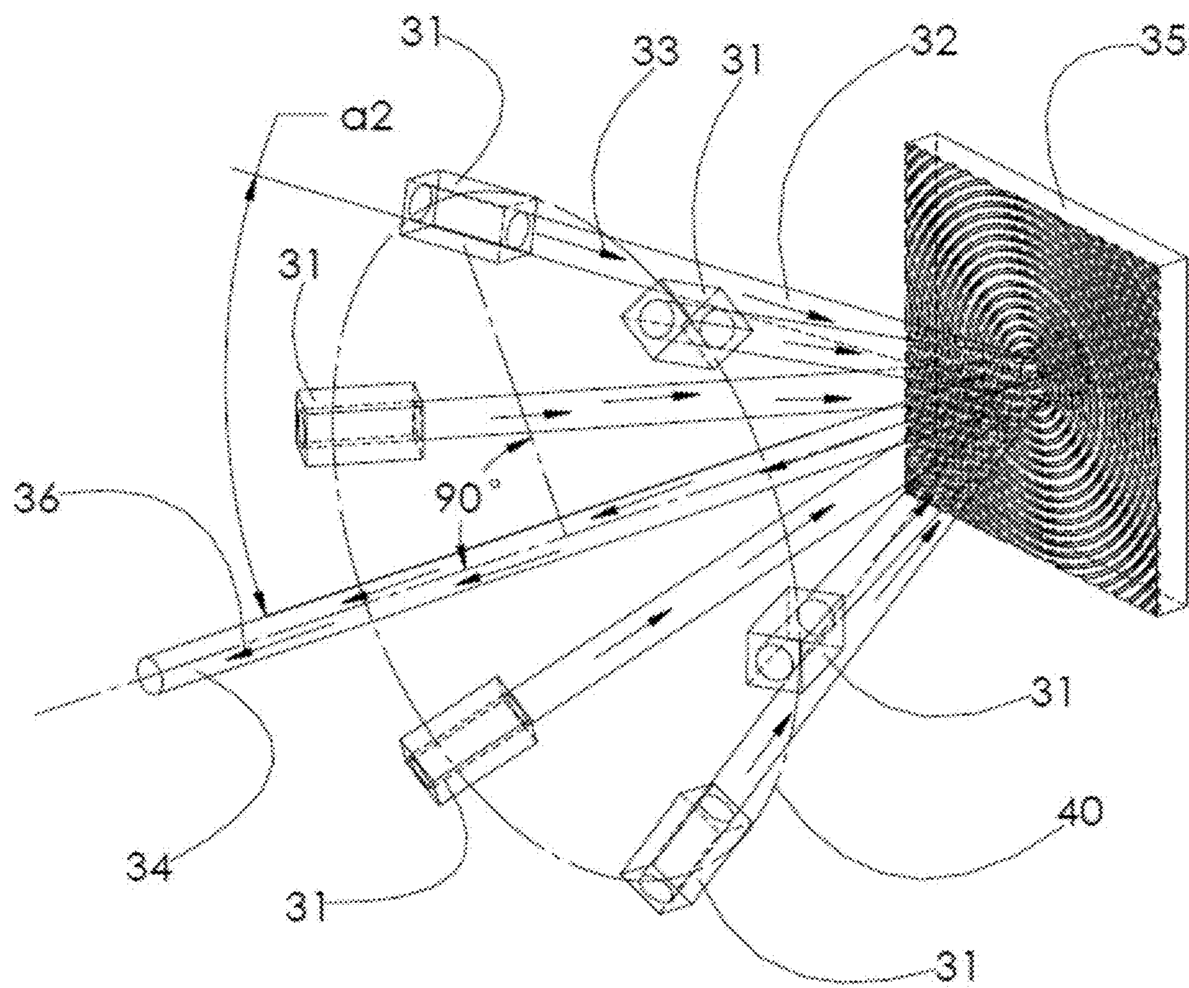
FIG. 2 is a perspective view of combining plural laser beams into a single laser beam using a diffraction grating in a reflective mode in accordance with an embodiment of the present disclosure.

FIG. 2 is a perspective view of combining plural laser beams into a single laser beam using a diffraction grating in a reflective mode in accordance with an embodiment of the present disclosure. The example illustrated in FIG. 2 shows combining six lasers 31 into one laser beam 34 using a diffraction grating 35 working in a reflective mode. The lasers 31 are placed or otherwise arranged in a ring pattern 30 of the diffraction order illustrated in FIG. 9. The beam combining concept is a reversed process of that demonstrated in FIG. 9. The lasers 31 are placed in one of the diffraction rings in FIG. 9 as reflective configuration and the laser beam 32 of each laser 31 is projected in a direction 33 to a central region of the diffraction grating 35. Due to the diffractive angle a2 of the diffraction grating 35, all lasers 31 will overlap into a single laser beam 34. In this case the wavelength of all lasers 31 matches with each other and a distance from the diffraction grating 35 to each of the lasers 31 is substantially equal to each other in order to maintain coherent beam characteristics. The laser beam 34 has coherent characteristics of beam propagation due to same frequency and constant phase difference. In order to obtain a zero-phase difference in all lasers 31, each phase factor of the lasers 31 can be adjusted to match 'in-phase' status for maximum brightness. The cone angle, a2, is matched with the diffractive angles of the diffraction grating 35 with the monochrome wavelength of the lasers 31. The lasers 31 can be any laser source that can produce a sufficiently narrow spectrum of single wavelength. For instance, lasers 31 may include semiconductor lasers, fiber lasers, DPSS lasers, gas lasers, liquid lasers, or any combination thereof.

Figure 3:
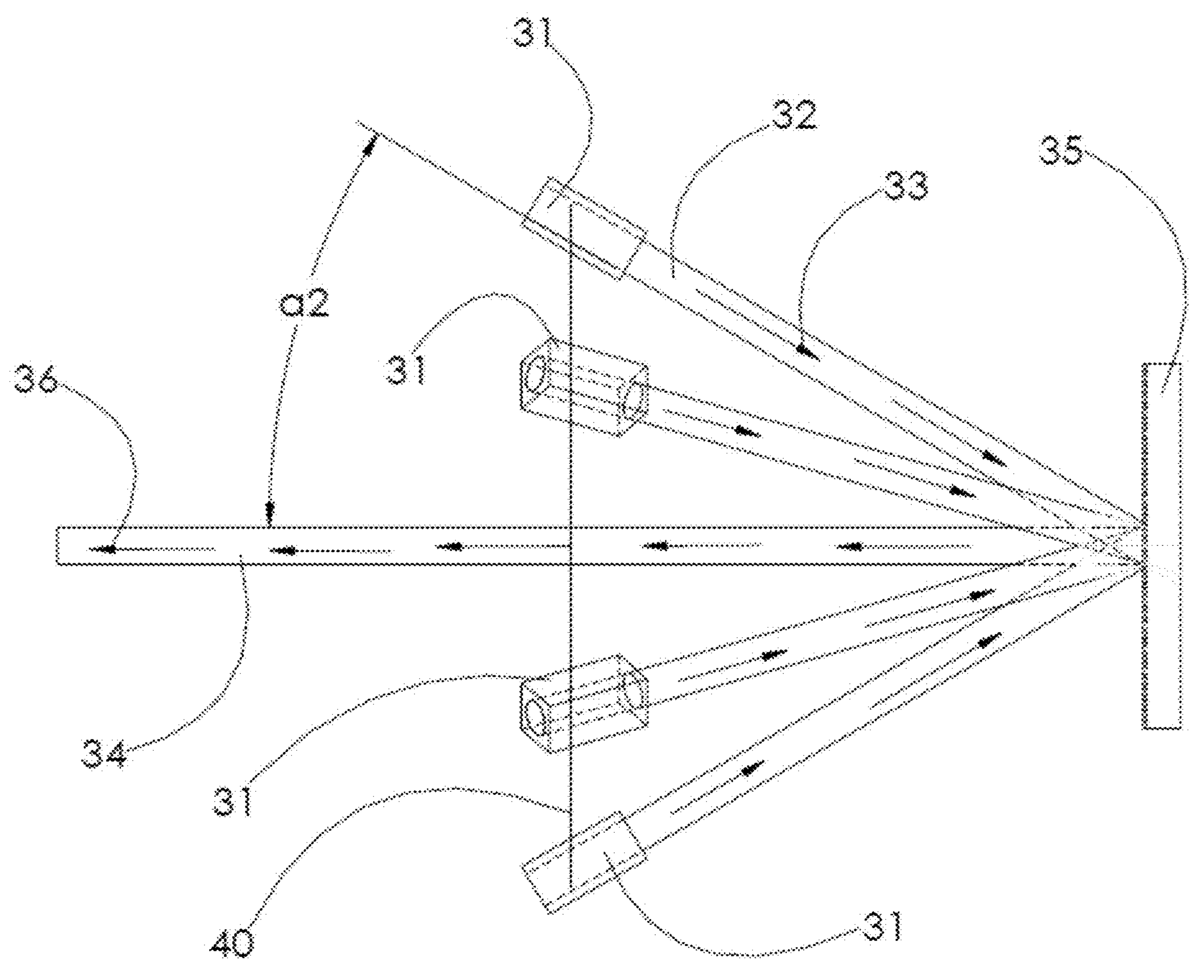
FIG. 3 is a projected side view of FIG. 2.

FIG. 3 is a projected side view of FIG. 2. FIG. 3 shows the beam 32 of each of the lasers 31 propagating onto the center of the diffraction grating 35. Each beam 32 is unidirectional (in the direction 33) and parallel collimated onto the diffraction grating 35. If the beam 32 is not sufficiently parallel collimation of the laser 31, the beam quality of the output beam 34 may be degraded. The cone angle of a2 is the same as the diffraction angle of the diffraction grating 35.

Figure 4:
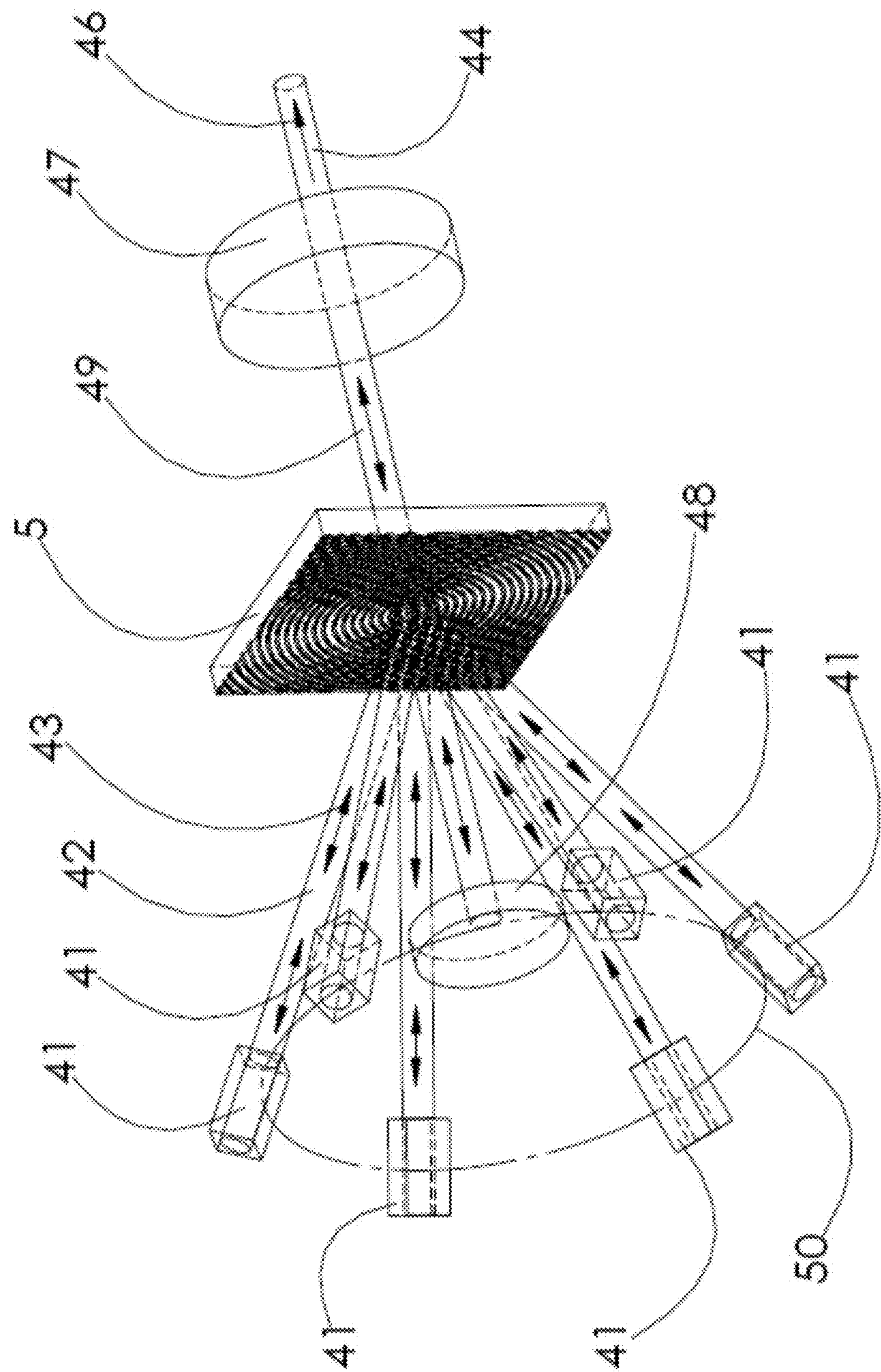
FIG. 4 is a perspective view of passive coherent beam combining of single-wavelength laser beams using an intra-cavity laser system along with a transmissive diffraction grating in accordance with an embodiment of the present disclosure.

FIG. 4 is a perspective view of passive coherent beam combining of single-wavelength laser beams using an intra-cavity laser system along with a transmissive diffraction grating in accordance with an embodiment of the present disclosure. The example illustrated in FIG. 4 shows passive coherent beam combining of single-wavelength lasers 41 using an intra-cavity laser system along with a transmissive diffractive grating 5. The beam combining technique presented in FIG. 1 is applied here, building an intra-cavity laser system, and the diffraction grating 5 has a circular pattern (e.g., with multiple concentric rings) or a spiral pattern (e.g., with a spiraling curve). All lasers 41 are placed or otherwise arranged on the 1st order of diffracted ring pattern of the diffraction grating 5 and the beams 42 emitted by lasers 41 are focused onto a central region of the diffraction grating 5. At least a portion of the refracted beams 49 on a center axis 46 of the diffraction grating 5 is reflected back (circulated) to the diffraction grating 5 by a high reflectance mirror 48 and the reflected beam is fed into the diffraction grating 5. Some of circulating beams 49 come out through the partial reflector (output coupler) 47 as a laser beam 44. Each laser 41 in the ring 50 is designed to work as an intra-cavity laser formed by the high reflector 48, the diffraction grating 5 and the partial reflector 47. All lasers 41 resonate between the high reflector 48 and the partial reflector 47. The diffraction grating 5 is used to combine laser beams of all lasers 41 into a laser cavity built between the partial reflector 47 and the lasers 41.

Figure 5:
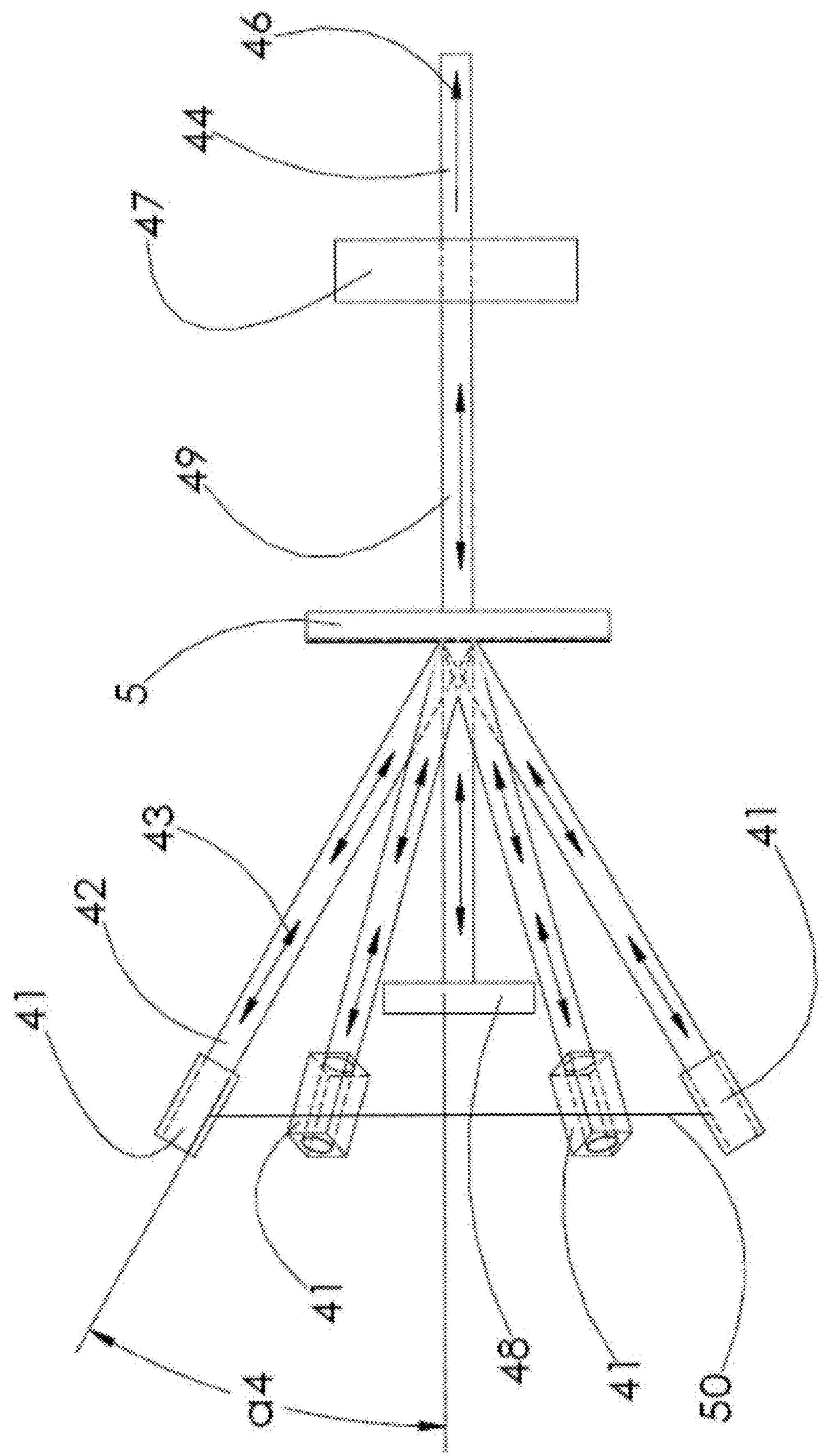
FIG. 5 is a projected side view of FIG. 4.

FIG. 5 is a projected side view of FIG. 4. FIG. 5 shows that laser beams 42 emitted by lasers 41 are projected onto the transmissive diffraction grating 5 and some of the laser beams (42) are diffracted to the partial reflector 47. Some of the beams 49 are reflected by the partial reflector 47 and returned back to the transmissive diffraction grading 5. The beams 49 can diffract to lasers 41 or reflect by the high reflector 48 back to the laser cavity. As the laser beams circulate around the resonator, they eventually come out through the partial reflector 47 as a coherent laser beam 44. The lasers 41 have a single wavelength with a diffraction angle of a4 that allows each emitted beam 42 to diffract into a respective beam 49 and circulate in the laser cavity comprised of the partial reflector 47, the high reflector 48 and the respective laser 41. This innovative intra-cavity laser design will result in a coherent combined beam being generated by the lasers 41. The lasers 41 can be any laser source that can produce a sufficiently narrow spectrum of single wavelength. For instance, lasers 41 may include semiconductor lasers, fiber lasers, DPSS lasers, gas lasers, liquid lasers, or any combination thereof.

Figure 6:
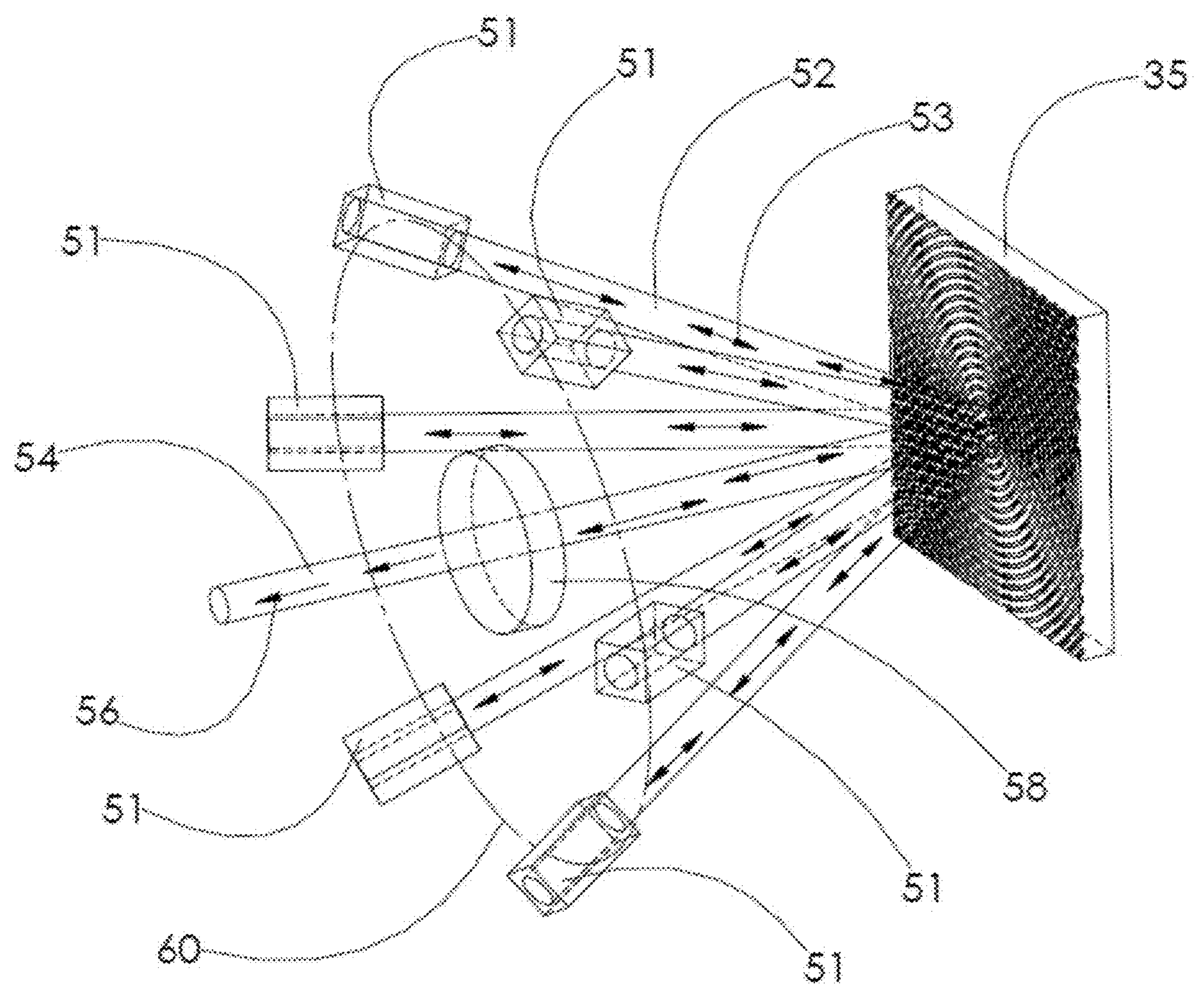
FIG. 6 is a perspective view of passive coherent beam combining of single-wavelength laser beams using an intra-cavity laser system along with a reflective diffraction grating in accordance with an embodiment of the present disclosure.

FIG. 6 is a perspective view of passive coherent beam combining of single-wavelength laser beams using an intra-cavity laser system along with a reflective diffraction grating in accordance with an embodiment of the present disclosure. The example illustrated in FIG. 6 shows passive coherent beam combining of single-wavelength lasers 51 using an intra-cavity laser system along with reflective diffractive grating 35. The beam combining technique presented in FIG. 2 is applied here, building an intra-cavity laser system, and the diffraction grating 35 has a circular pattern (e.g., with multiple concentric rings) or spiral pattern (e.g., with a spiraling curve). All lasers 51 are placed or otherwise arranged on the 1st order of diffracted ring pattern of the diffraction grating 35, and the beams 52 emitted by lasers 51 in a direction 53 are focused onto a central region of the diffraction grating 35. A diffracted beam 54 of the emitted beams 52 is on a center axis 56 of the diffraction grating 35, and some of the beam 54 is reflected by the partial reflector 58 to come out as a single laser beam 54 in a direction 56. The beams 52 are circulated between the lasers 51 and the partial reflector 58, and the beams 52 comes out through the partial reflector (output coupler) 58. Each laser 51 in the ring 60 is designed to work as an intra-cavity laser formed by the diffraction grating 35 and the partial reflector 58. The reflective diffraction grating 35 has a function of coherently combining beams 52 emitted by lasers 51 into a single beam 54 in a single wavelength and narrow wavelength bandwidth compared to other beam combining techniques.

Figure 7:
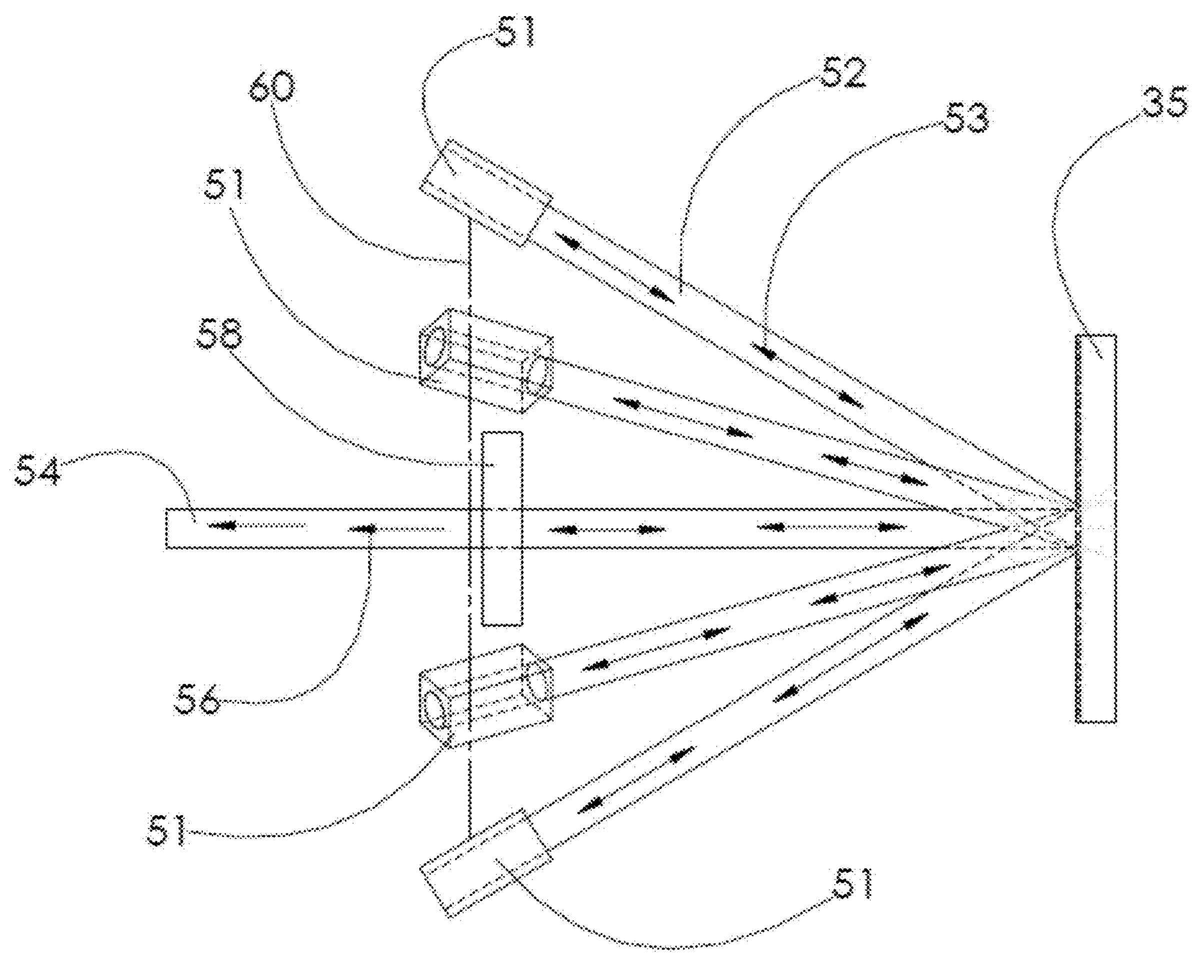
FIG. 7 is a projected side view of FIG. 6.

FIG. 7 is a projected side view of FIG. 6. FIG. 7 shows that laser beams 52 emitted by all lasers 51 are projected onto the reflective diffraction grating 35 and the laser beams 52 are diffracted by the diffraction grating 35 to the partial reflector 58. Some of the beams 52 are reflected on the partial reflector 58 and then returned back to the lasers 51 by the reflective diffraction grading 35. The beam 54 passes through the partial reflector 58, which acts to coherently combine all laser beams 52. Each beam 52 is angled to match with a diffractive angle of the circular or spiral pattern of the diffraction grating 35 to come out on the center axis 56 of the diffraction grating 35. The partial reflector (output coupler) 58 is placed on the center axis 56 of the diffraction grating 35 to build an intra-cavity laser resonator for the lasers 51. The diffraction grating 35 with one or more circular or spiral patterns allows combing multiple laser beams 52 into a single coherent beam 54.

Figure 8:
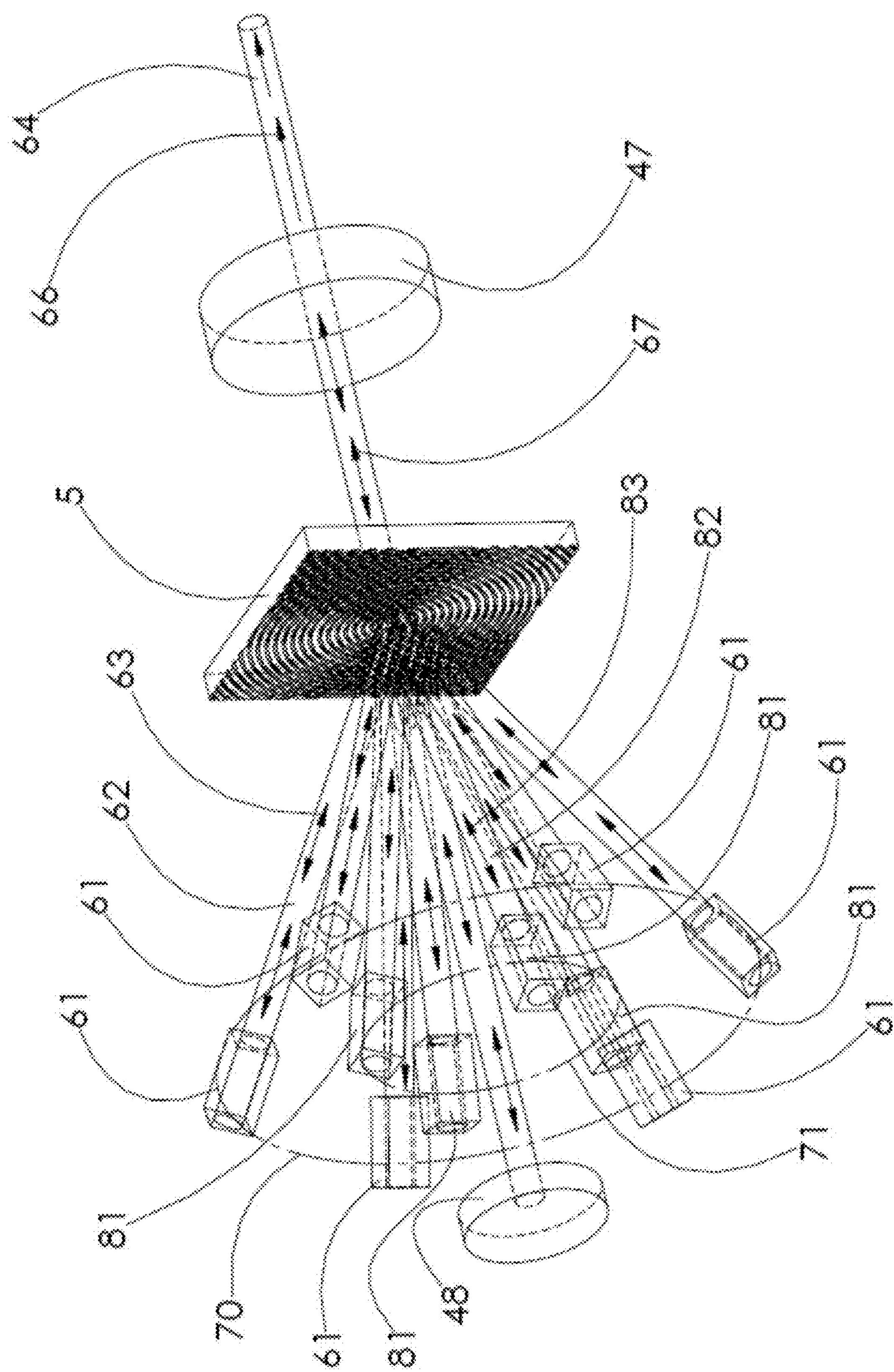
FIG. 8 is a perspective view of incoherent beam combining of multiple-wavelength laser beams using a transmissive diffraction grating in accordance with an embodiment of the present disclosure.
Figure 11:
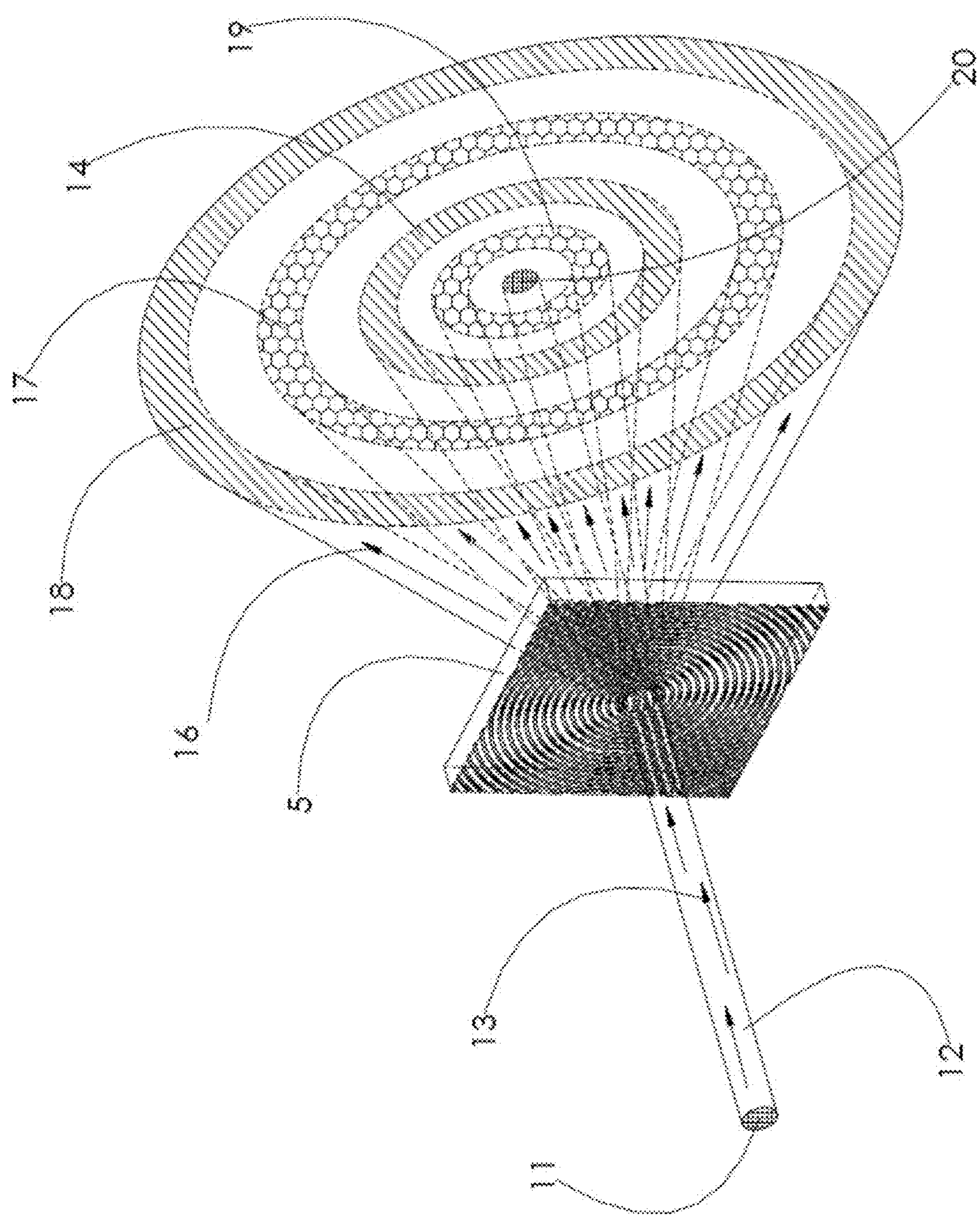
FIG. 11 is a perspective view of a prior art multiple-wavelength laser beam impinging on a diffraction grating.
Figure 12:
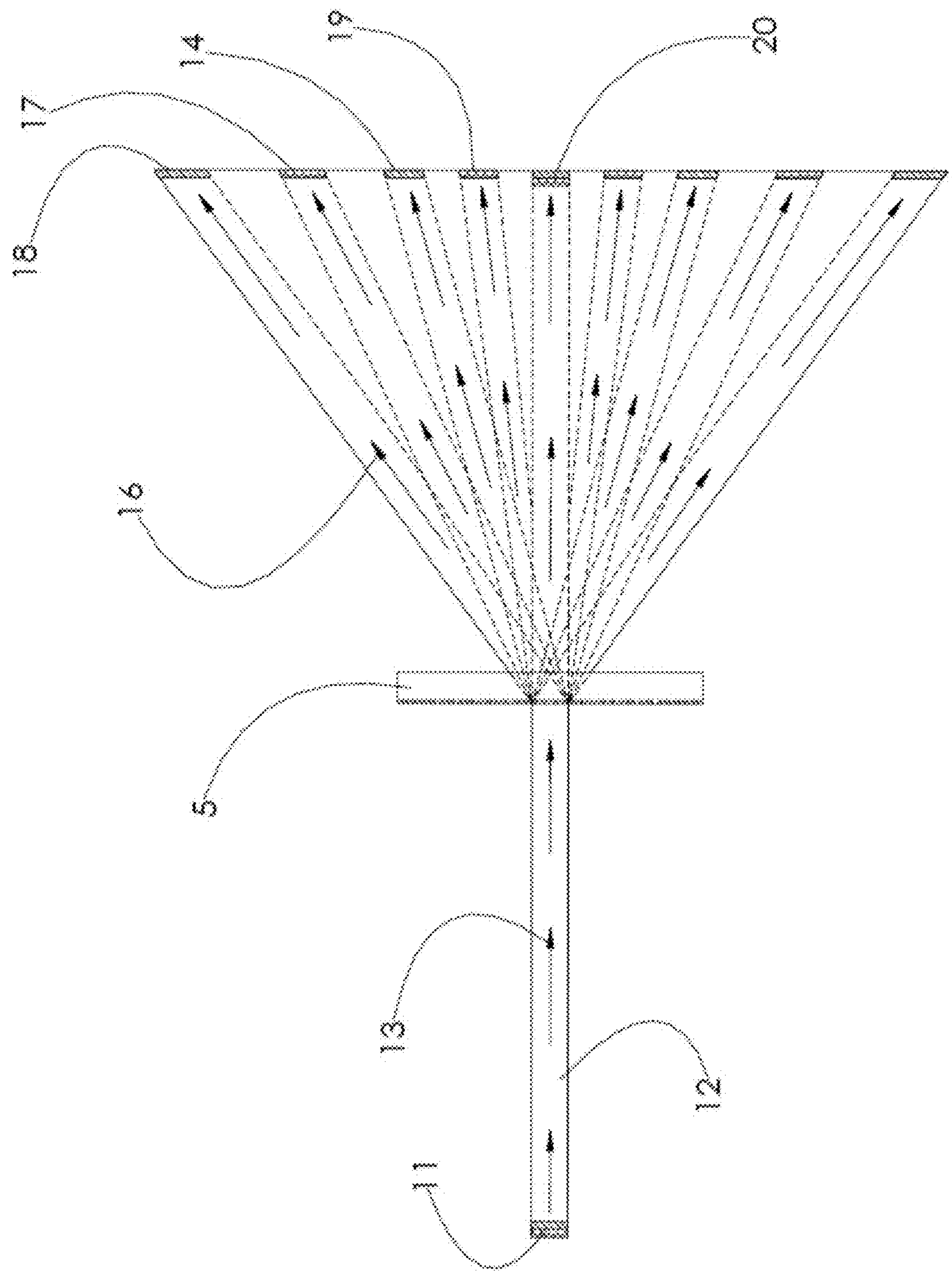
FIG. 12 is a projected side view of FIG. 11.

FIG. 8 is a perspective view of incoherent beam combining of multiple-wavelength laser beams using a transmissive diffraction grating in accordance with an embodiment of the present disclosure. The example illustrated in FIG. 8 shows incoherent beam combining of multiple wavelengths using a transmissive diffraction grating 5. The beam combining concept is the reverse process of a multiple wavelength laser beam that is diffracted by a circular or spiral patterned transmissive grating as illustrated in FIG. 11. The basic concept is where each different wavelength of collinear laser beams impinging on the center of the diffractive grating will generate multiple orders of diffraction rings. For instance, if laser beams with two different wavelengths are placed in two separate diffraction rings grouped by the respective wavelength, then all laser beams in each ring can be combined into a single laser beam mixed with two separate wavelengths. However, the combined laser beam cannot be a coherent laser beam due to the two separate rings with two different wavelengths in this example. FIG. 8 shows two separate rings 70 and 71 of laser placement. A first and outer ring 70 contains multiple lasers 61 that are disposed or otherwise arranged along the ring 70. A second and inner ring 71 contains multiple lasers 81 that are disposed or otherwise arranged along the ring 71. The lasers 61 and the lasers 81 have different wavelengths matched with different diffraction angles of the diffraction grating 5, and this allows the diffraction grating 5 to diffract each of the laser beams 62 and 82, emitted by lasers 61 and lasers 81 in the rings 70 and 71, respectively, into a single laser beam 64. A part of the beam 64 will be reflected by a partial reflector 47 and a part of the beam 64 will be transmitted as a laser beam 64 out of the partial reflector 47 along a center axis 66 of the diffraction grating 5. The beam combining process of using a circular or spiral pattern of the diffractive grating 5 in the intra-cavity design of laser system will generate a coherent beam of each wavelength, and the combined beam becomes incoherent as the mixed beam 64.

Highlight of Select Features

In view of the above, select features in accordance with the present disclosure are highlighted below.

In one aspect, a method of coherently combining a plurality of optical beams may involve arranging a plurality of single-wavelength lasers in a ring-shaped pattern. The method may also involve energizing the plurality of single-wavelength lasers to emit the plurality of optical beams such that the plurality of optical beams impinge on a central region of a diffractive element to combine the optical beams to form a single laser beam. The single laser beam may resonate through a laser cavity formed by a partial reflector and the plurality of single-wavelength lasers.

In some implementations, the single-wavelength lasers may include at least one array of semiconductor diode lasers, fiber lasers, solid-state lasers, gas lasers, or a combination thereof.

In some implementations, a spectral bandwidth of the optical beams emitted by the single-wavelength lasers may be equal to or less than 5 nanometers.

In some implementations, the diffractive element may include a reflective grating or a transmissive grating.

In some implementations, the diffractive element may include a circular grating configured to generate one or more ring-like diffractive patterns. In some implementations, the one or more ring-like diffractive patterns may include a continuous or discrete form of one or more ring-like shapes. In some implementations, the one or more ring-like diffractive patterns may match with a diffractive angle of the diffractive element at the single-wavelength lasers.

In some implementations, the diffractive element may include a spiral grating configured to generate one or more ring-like diffractive patterns. In some implementations, the one or more ring-like diffractive patterns may include a continuous or discrete form of one or more ring-like shapes. In some implementations, the one or more ring-like diffractive patterns may match with a diffractive angle of the diffractive element at the single-wavelength lasers.

In another aspect, a method of incoherently combining a plurality of optical beams may involve arranging a plurality of multiple-wavelength lasers in a plurality of ring-shaped patterns. The method may also involve energizing the plurality of multiple-wavelength lasers to emit the plurality of optical beams such that the plurality of optical beams impinge on a central region of a diffractive element to combine the optical beams to form a single laser beam. The single laser beam may resonate through a laser cavity formed by a partial reflector and the plurality of multiple-wavelength lasers.

In some implementations, the multiple-wavelength lasers may include at least one array of semiconductor diode lasers, fiber lasers, solid-state lasers, gas lasers, or a combination thereof.

In some implementations, each of the optical beams may have at least two separate wavelengths, with each of the at least two separate wavelengths having a spectral bandwidth equal to or less than 5 nanometers.

In some implementations, the diffractive element may include a reflective grating or a transmissive grating.

In some implementations, the diffractive element may include a circular grating configured to generate one or more ring-like diffractive patterns at a plurality of wavelengths. In some implementations, the one or more ring-like diffractive patterns may include a continuous or discrete form of one or more ring-like shapes at the plurality of wavelengths. In some implementations, the one or more ring-like diffractive patterns may match with a diffractive angle of the diffractive element at the plurality of multiple-wavelength lasers.

In some implementations, the diffractive element may include a spiral grating configured to generate one or more ring-like diffractive patterns at a plurality of wavelengths. In some implementations, the one or more ring-like diffractive patterns may include a continuous or discrete form of one or more ring-like shapes at the plurality of wavelengths. In some implementations, the one or more ring-like diffractive patterns may match with a diffractive angle of the diffractive element at the plurality of multiple-wavelength lasers.

In one aspect, a system for coherently combining a plurality of optical beams may include a plurality of single-wavelength lasers arranged in a ring-shaped pattern and a diffractive element. When energized, the plurality of single-wavelength lasers may emit the plurality of optical beams such that the plurality of optical beams impinge on a central region of the diffractive element to combine the optical beams to form a single laser beam. The single laser beam may resonate through a laser cavity formed by a partial reflector and the plurality of single-wavelength lasers.

In some implementations, the single-wavelength lasers may include at least one array of semiconductor diode lasers, fiber lasers, solid-state lasers, gas lasers, or a combination thereof.

In some implementations, a spectral bandwidth of the optical beams emitted by the single-wavelength lasers may be equal to or less than 5 nanometers.

In some implementations, the diffractive element may include a reflective grating or a transmissive grating.

In some implementations, the diffractive element may include a circular grating configured to generate one or more ring-like diffractive patterns. In some implementations, the one or more ring-like diffractive patterns may include a continuous or discrete form of one or more ring-like shapes. In some implementations, the one or more ring-like diffractive patterns may match with a diffractive angle of the diffractive element at the single-wavelength lasers.

In some implementations, the diffractive element may include a spiral grating configured to generate one or more ring-like diffractive patterns. In some implementations, the one or more ring-like diffractive patterns may include a continuous or discrete form of one or more ring-like shapes. In some implementations, the one or more ring-like diffractive patterns may match with a diffractive angle of the diffractive element at the single-wavelength lasers.

In another aspect, a system for incoherently combining a plurality of optical beams may include a plurality of multiple-wavelength lasers arranged in a plurality of ring-shaped patterns and a diffractive element. When energized, the plurality of multiple-wavelength lasers may emit the plurality of optical beams such that the plurality of optical beams impinge on a central region of the diffractive element to combine the optical beams to form a single laser beam. The single laser beam may resonate through a laser cavity formed by a partial reflector and the plurality of multiple-wavelength lasers.

In some implementations, the multiple-wavelength lasers may include at least one array of semiconductor diode lasers, fiber lasers, solid-state lasers, gas lasers, or a combination thereof.

In some implementations, each of the optical beams may have at least two separate wavelengths, with each of the at least two separate wavelengths having a spectral bandwidth equal to or less than 5 nanometers.

In some implementations, the diffractive element may include a reflective grating or a transmissive grating.

In some implementations, the diffractive element may include a circular grating configured to generate one or more ring-like diffractive patterns at a plurality of wavelengths. In some implementations, the one or more ring-like diffractive patterns may include a continuous or discrete form of one or more ring-like shapes at the plurality of wavelengths. In some implementations, the one or more ring-like diffractive patterns may match with a diffractive angle of the diffractive element at the plurality of multiple-wavelength lasers.

In some implementations, the diffractive element may include a spiral grating configured to generate one or more ring-like diffractive patterns at a plurality of wavelengths. In some implementations, the one or more ring-like diffractive patterns may include a continuous or discrete form of one or more ring-like shapes at the plurality of wavelengths. In some implementations, the one or more ring-like diffractive patterns may match with a diffractive angle of the diffractive element at the plurality of multiple-wavelength lasers.

ADDITIONAL NOTES AND CONCLUSION

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system capable of coherently combining a plurality of optical beams, comprising:

a plurality of single-wavelength lasers arranged in a ring-shaped pattern; and a diffractive element, wherein, when energized, the plurality of single-wavelength lasers emit the plurality of optical beams such that the plurality of optical beams impinge on a central region of the diffractive element to combine the optical beams to form a single laser beam, wherein the single laser beam resonates through a laser cavity formed by a partial reflector and the plurality of single-wavelength lasers, and wherein the diffractive element comprises a circular grating configured to generate one or more ring-like diffractive patterns.

2. The system of claim 1, wherein the single-wavelength lasers comprise at least one array of semiconductor diode lasers, fiber lasers, solid-state lasers, gas lasers, or a combination thereof.

3. The system of claim 1, wherein a spectral bandwidth of the optical beams emitted by the single-wavelength lasers is equal to or less than 5 nanometers.

4. The system of claim 1, wherein the diffractive element comprises a reflective grating or a transmissive grating.

5. The system of claim 1, wherein the one or more ring-like diffractive patterns comprise a continuous or discrete form of one or more ring-like shapes.

6. The system of claim 1, wherein the one or more ring-like diffractive patterns match with a diffractive angle of the diffractive element at the single-wavelength lasers.

7. A system capable of coherently combining a plurality of optical beams, comprising:

a plurality of single-wavelength lasers arranged in a ring-shaped pattern; and a diffractive element, wherein, when energized, the plurality of single-wavelength lasers emit the plurality of optical beams such that the plurality of optical beams impinge on a central region of the diffractive element to combine the optical beams to form a single laser beam, wherein the single laser beam resonates through a laser cavity formed by a partial reflector and the plurality of single-wavelength lasers, and wherein the diffractive element comprises a spiral grating configured to generate one or more ring-like diffractive patterns.

8. The system of claim 7, wherein the one or more ring-like diffractive patterns comprise a continuous or discrete form of one or more ring-like shapes.

9. The system of claim 7, wherein the one or more ring-like diffractive patterns match with a diffractive angle of the diffractive element at the single-wavelength lasers.

* * * * *